(12) United States Patent
Negishi et al.

(10) Patent No.: US 11,053,974 B2
(45) Date of Patent: Jul. 6, 2021

(54) SLIDING COMPONENT

(71) Applicant: EAGLE INDUSTRY CO., LTD., Tokyo (JP)

(72) Inventors: Yuta Negishi, Tokyo (JP); Hiroki Inoue, Tokyo (JP); Yuki Maetani, Tokyo (JP); Takeshi Hosoe, Tokyo (JP); Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 143 days.

(21) Appl. No.: 16/465,965

(22) PCT Filed: Dec. 1, 2017

(86) PCT No.: PCT/JP2017/043225
§ 371 (c)(1),
(2) Date: May 31, 2019

(87) PCT Pub. No.: WO2018/105505
PCT Pub. Date: Jun. 14, 2018

(65) Prior Publication Data
US 2019/0301522 A1 Oct. 3, 2019

(30) Foreign Application Priority Data
Dec. 7, 2016 (JP) .............................. JP2016-237217

(51) Int. Cl.
*F16J 15/34* (2006.01)
*F16C 33/12* (2006.01)
(Continued)

(52) U.S. Cl.
CPC ............ *F16C 17/026* (2013.01); *F16C 17/02* (2013.01); *F16C 33/107* (2013.01); *F16C 33/12* (2013.01); *F16J 15/34* (2013.01)

(58) Field of Classification Search
CPC .... F16J 15/34; F16J 15/00; F16J 15/50; F16J 15/52; F16J 15/3408; F16J 15/3412;
(Continued)

(56) References Cited

U.S. PATENT DOCUMENTS 5,201,531 A * 4/1993 Lai ........................ F16J 15/3412
277/400
8,814,433 B2 * 8/2014 Tokunaga ............. F16C 17/045
384/123
(Continued)

FOREIGN PATENT DOCUMENTS

JP H0666374 B2 8/1994
WO 2012046749 A1 4/2012
(Continued)

OTHER PUBLICATIONS

International Search Report (ISR) dated Feb. 27, 2018, issued for International application No. PCT/JP2017/043225. (1 page).

*Primary Examiner* — Nathan Cumar
(74) *Attorney, Agent, or Firm* — Law Office of Katsuhiro Arai

(57) ABSTRACT

In an exemplary embodiment, a sliding component includes a pair of sliding parts 3 and 5 sliding relative to each other, with a high-pressure gas present on one side of the pair of sliding parts 3 and 5 and a low-pressure liquid on the other side. At least the sliding part 5 has a sliding face S provided with positive pressure generation mechanisms 10 each having a positive pressure generation groove 11, and provided with an annular deep groove 14 on the high-pressure gas side. The annular deep groove 14 is isolated from the high-pressure gas side by a land R, and is connected to the low-pressure liquid side through radial deep grooves 13. The sliding component is capable of fulfilling both conflicting conditions of sealing and lubrication, with a gas on the
(Continued)

high-pressure fluid side and a liquid on the low-pressure fluid side.

12 Claims, 10 Drawing Sheets

(51) Int. Cl.
*F16C 17/02* (2006.01)
*F16C 33/10* (2006.01)

(58) Field of Classification Search
CPC .... F16J 15/3416; F16J 15/342; F16C 17/026; F16C 17/00; F16C 17/02; F16C 33/107; F16C 33/00; F16C 33/10; F16C 33/12; F16C 33/124
USPC ......................................................... 277/399
See application file for complete search history.

(56) References Cited

U.S. PATENT DOCUMENTS

| | | | |
|---|---|---|---|
| 2013/0209011 A1* | 8/2013 | Tokunaga | F16C 33/74 384/123 |
| 2015/0115537 A1* | 4/2015 | Tokunaga | F16J 15/34 277/348 |
| 2017/0167615 A1* | 6/2017 | Itadani | F16J 15/34 |

FOREIGN PATENT DOCUMENTS

| | | |
|---|---|---|
| WO | 2014050920 A1 | 4/2014 |
| WO | 2015199171 A1 | 12/2015 |

\* cited by examiner

SLIDING COMPONENT

CROSS-REFERENCE TO RELATED APPLICATIONS

This application is the U.S. National Phase under 35 U.S.C. § 371 of International Application PCT/JP2017/043225, filed Dec. 1, 2017, which claims priority to Japanese Patent Application No. 2016-237217, filed Dec. 7, 2016. The International Application was published under PCT Article 21(2) in a language other than English.

TECHNICAL FIELD

The present invention relates to sliding components suitable, for example, as mechanical seals, bearings, and other sliding units. More particularly, the present invention relates to sliding parts such as seal rings or bearings that require friction reduction by fluid intervention between sliding faces, and prevention of fluid leakage from the sliding faces.

BACKGROUND ART

A mechanical seal, an example of a sliding component, is evaluated for its performance, based on the leakage rate, wear rate, and torque. Conventional arts have optimized the sliding materials and the sliding face roughness of mechanical seals to enhance performance and achieve low leakage, long life, and low torque. However, due to growing awareness of environmental problems in recent years, a further improvement in the performance of mechanical seals has been required, and technical development beyond the limits of the conventional arts has been necessary.

Under these circumstances, the present applicant has filed a patent application for an invention of a sliding component that does not leak during rest, and operates with fluid lubrication while preventing leakage during rotation including the early stages of rotation, to be able to achieve both sealing and lubrication (hereinafter, referred to as the "conventional art." See Patent Document 1).

As an embodiment of the conventional art, disclosed is a sliding component as shown in FIG. 13 of Patent Document 1, in which one of sliding faces sliding relative to each other of a pair of sliding parts is provided, on the high-pressure side, with positive pressure generation mechanisms 3 each formed by a positive pressure generation groove, and on the low-pressure side, with negative pressure generation mechanisms 4 each formed by a negative pressure generation groove, and is also provided with a pressure release groove 15 between the positive pressure generation grooves 5 and the negative pressure generation grooves 6, and the positive pressure generation grooves 5, the pressure release groove 15, and the negative pressure generation grooves 6 communicate with the high-pressure fluid side, and are isolated from the low-pressure fluid side by a sealing face.

CITATION LIST

Patent Document

Patent Document 1: WO 2012/046749 A1 (FIG. 13)

SUMMARY OF THE INVENTION

Problem to be Solved by the Invention

The above conventional art is excellent in not leaking during rest and operating with fluid lubrication while preventing leakage during rotation including the early stages of rotation, to be able to achieve both sealing and lubrication. However, it is intended for use with a liquid as a sealed fluid present on the high-pressure fluid side and a gas (atmosphere) on the low-pressure fluid side. Therefore, if, with a gas on the high-pressure fluid side and a liquid on the low-pressure fluid side, positive pressure is generated by relative sliding of the sliding faces, slightly opening a space between the sliding faces, the high-pressure gas will enter the space between the sliding faces, and can make it difficult for the sliding faces to slide while holding a liquid film between the sliding faces, causing the liquid film to run out. In addition, the gas on the high-pressure fluid side can leak to the liquid side that is the low-pressure fluid side.

It is an object of the present invention to provide a sliding component that, with a gas on the high-pressure fluid side and a liquid on the low-pressure fluid side, actively introduces the liquid on the low-pressure fluid side into the entire sliding face to enable sliding with a liquid film maintained, and seals both fluids on the high-pressure side and the low-pressure side, and thereby can fulfill both conflicting conditions of sealing and lubrication.

Means for Solving Problem

To achieve the above object, a sliding component according to a first aspect of the present invention includes a pair of sliding parts sliding relative to each other, with a high-pressure gas present on one side of the pair of sliding parts and a low-pressure liquid on the other side, at least one of the sliding parts having a sliding face provided with a positive pressure generation mechanism having a positive pressure generation groove, and provided with an annular deep groove on the high-pressure gas side, the annular deep groove being isolated from the high-pressure gas side by a land, and being connected to the low-pressure liquid side through a radial deep groove.

According to this aspect, the sliding component fulfilling both conflicting conditions of sealing and lubrication can be provided which actively introduces the low-pressure liquid into the entire sliding face while preventing the high-pressure gas from entering a space between the sliding faces, enabling sliding with a liquid film maintained, and can seal both fluids on the high-pressure side and the low-pressure side.

According to a second aspect of the present invention, in the sliding component in the first aspect, the annular deep groove and the radial deep groove have a groove depth 250 times to 500 times a groove depth of the positive pressure generation groove.

According to this aspect, the liquid on the low-pressure fluid side can be introduced more actively into the entire sliding face while the entry of the high-pressure gas can be prevented.

According to a third aspect of the present invention, in the sliding component in the first or second aspect, the radial deep groove is one of a plurality of radial deep grooves provided circumferentially.

According to this aspect, the liquid can be introduced uniformly into the entire sliding face, and also the liquid can be introduced sufficiently into the annular deep groove.

According to a fourth aspect of the present invention, in the sliding component in any one of the first to third aspects, the positive pressure generation groove is provided on the low-pressure liquid side of the annular deep groove, and is connected to the low-pressure liquid side and isolated from the high-pressure gas side by a land.

According to this aspect, sufficient positive pressure can be generated at the sliding faces, using the viscosity of the low-pressure liquid.

According to a fifth aspect of the present invention, in the sliding component in the fourth aspect, the positive pressure generation groove is one of a plurality of positive pressure generation grooves, each groove being formed by a groove constituting a Rayleigh step mechanism, and at least some of the grooves are each formed to extend symmetrically on both sides of the radial deep groove in a circumferential direction.

According to this aspect, the sliding component can be suitable for an apparatus in which a rotating-side seal ring rotates in both directions.

According to a sixth aspect of the present invention, in the sliding component in the fourth aspect, the positive pressure generation groove is one of a plurality of positive pressure generation grooves, each groove being formed by a groove constituting a Rayleigh step mechanism, and at least some of the grooves each have a liquid introduction assist groove formed at a circumferentially central portion thereof.

According to this aspect, the introduction of the liquid into the sliding face can be assisted while the supply of the liquid for positive pressure generation at the grooves can be assisted. Even when the pressure difference between the high-pressure fluid and the low-pressure fluid is large, running out of the liquid film between the sliding faces S can be prevented.

According to a seventh aspect of the present invention, in the sliding component in any one of the first to sixth aspects, the sliding face of the one sliding part is provided with a negative pressure generation mechanism having a negative pressure generation groove.

According to this aspect, leakage of the high-pressure gas to the low-pressure side can be reduced to increase the sealing function.

Effect of the Invention

The present invention has the following outstanding effects.

(1) In the sliding component in which a high-pressure gas is present on one side of the pair of sliding parts and a low-pressure liquid on the other side, at least one of the sliding parts has the sliding face provided with the positive pressure generation mechanism having the positive pressure generation groove, and provided with the annular deep groove on the high-pressure gas side, the annular deep groove is isolated from the high-pressure gas side by the land, and is connected to the low-pressure liquid side through the radial deep groove. Consequently, the sliding component fulfilling both conflicting conditions of sealing and lubrication can be provided which actively introduces the low-pressure liquid into the entire sliding face while preventing the high-pressure gas from entering the space between the sliding faces, enabling sliding with a liquid film maintained, and can seal both fluids on the high-pressure side and the low-pressure side.

(2) The annular deep groove and the radial deep groove have the groove depth 250 times to 500 times the groove depth of the positive pressure generation groove. Consequently, the liquid on the low-pressure fluid side can be introduced more actively into the entire sliding face while the entry of the high-pressure gas can be prevented.

(3) The radial deep groove is one of the plurality of radial deep grooves provided circumferentially. Consequently, the liquid can be introduced uniformly into the entire sliding face, and also the liquid can be introduced sufficiently into the annular deep groove.

(4) The positive pressure generation groove is provided on the low-pressure liquid side of the annular deep groove, and is connected to the low-pressure liquid side and isolated from the high-pressure gas side by the land. Consequently, sufficient positive pressure can be generated at the sliding faces, using the viscosity of the low-pressure liquid.

(5) The positive pressure generation groove is one of the plurality of positive pressure generation grooves, each groove being formed by the groove constituting the Rayleigh step mechanism, and at least some of the grooves are each formed to extend symmetrically on both sides of the radial deep groove in the circumferential direction. Consequently, the sliding component can be suitable for an apparatus in which a rotating-side seal ring rotates in both directions.

(6) The positive pressure generation groove is one of the plurality of positive pressure generation grooves, each groove being formed by the groove constituting the Rayleigh step mechanism, and at least some of the grooves each have the liquid introduction assist groove formed at the circumferentially central portion thereof. Consequently, the introduction of the liquid into the sliding face can be assisted while the supply of the liquid for positive pressure generation at the grooves can be assisted. Even when the pressure difference between the high-pressure fluid and the low-pressure fluid is large, running out of the liquid film between the sliding faces S can be prevented.

(7) The sliding face of the one sliding part is provided with the negative pressure generation mechanism having the negative pressure generation groove. Consequently, leakage of the high-pressure gas to the low-pressure side can be reduced to increase the sealing function.

BRIEF DESCRIPTION OF THE DRAWINGS

FIG. 4A shows a Rayleigh step mechanism for explaining a positive pressure generation mechanism formed by a Rayleigh step mechanism or the like.

FIG. 4B shows a reversed Rayleigh step mechanism for explaining a negative pressure generation mechanism formed by a reversed Rayleigh step mechanism or the like.

DESCRIPTION OF EMBODIMENTS

Hereinafter with reference to the drawings, a mode for carrying out this invention will be described illustratively based on embodiments. However, the dimensions, materials, shapes, relative arrangements, and the like of components described in the embodiments are not intended to limit the scope of the present invention only to them, unless otherwise described explicitly.

First Embodiment

With reference to FIGS. 1 to 4B, a sliding component according to a first embodiment of the present invention will be described.

In the following embodiment, a mechanical seal, an example of the sliding component, will be described as an example. In the description, it is assumed that the outer peripheral side of sliding parts constituting the mechanical seal is the low-pressure liquid side (also referred to as the low-pressure fluid side), and the inner peripheral side is the high-pressure gas side (also referred to as the high-pressure fluid side). The present invention, however, is not limited to this, and is applicable to a case where the low-pressure fluid side and the high-pressure fluid side are reversed.

Figure 1:
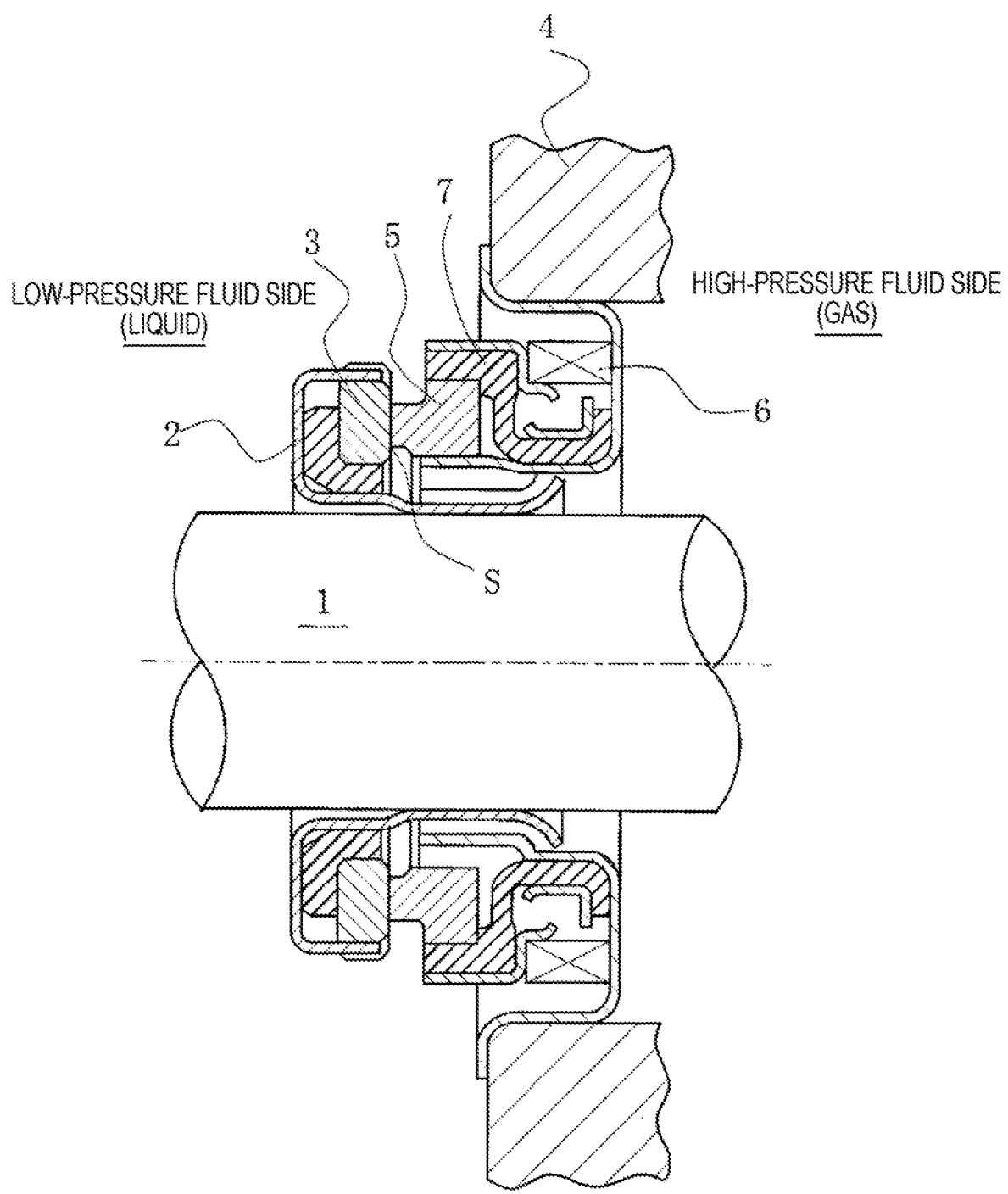
FIG. 1 is a vertical cross-sectional view showing an example of a mechanical seal according to a first embodiment of the present invention.

FIG. 1 is a vertical cross-sectional view showing an example of the mechanical seal, which is an outside mechanical seal in the form of sealing a high-pressure gas that tends to leak from the inner periphery of a sliding face toward the outer periphery. The mechanical seal is provided with an annular rotating-side seal ring 3, one of the sliding parts, provided at a rotating shaft 1 via a sleeve 2 in a state of being integrally rotatable with the rotating shaft 1, and an annular stationary-side seal ring 5, the other sliding part, provided at a housing 4 in non-rotating and axially movable states. They slide in close contact on each other's sliding faces S by means of a coiled wave spring 6 and a bellows 7 both axially biasing the stationary-side seal ring 5. That is, the mechanical seal prevents, at each other's sliding faces S of the rotating-side seal ring 3 and the stationary-side seal ring 5, the high-pressure gas from flowing out from the inner peripheral side to the outer peripheral side.

Figure 2:
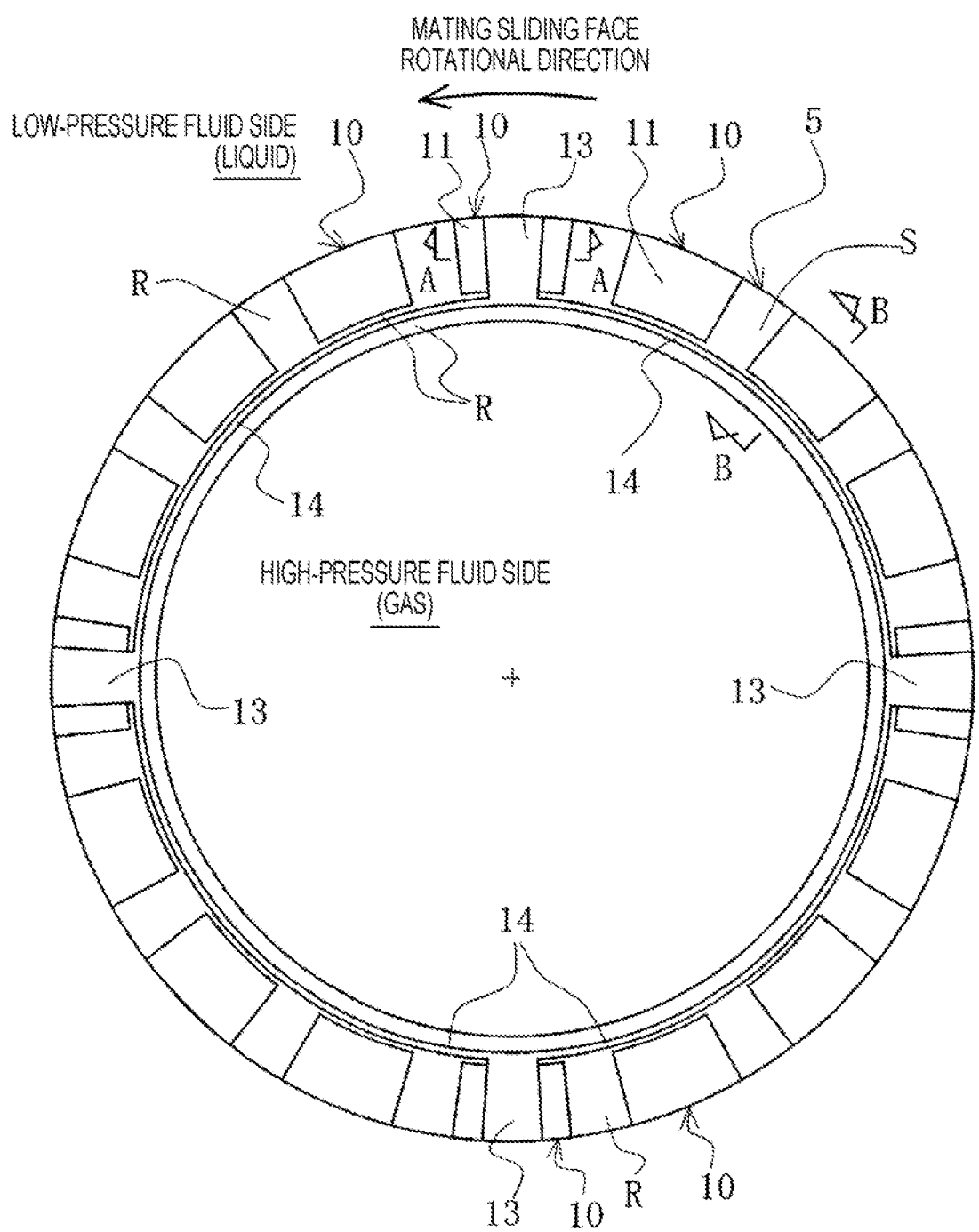
FIG. 2 is a plan view showing a sliding face of a sliding part of the mechanical seal according to the first embodiment of the present invention.
Figure 3:
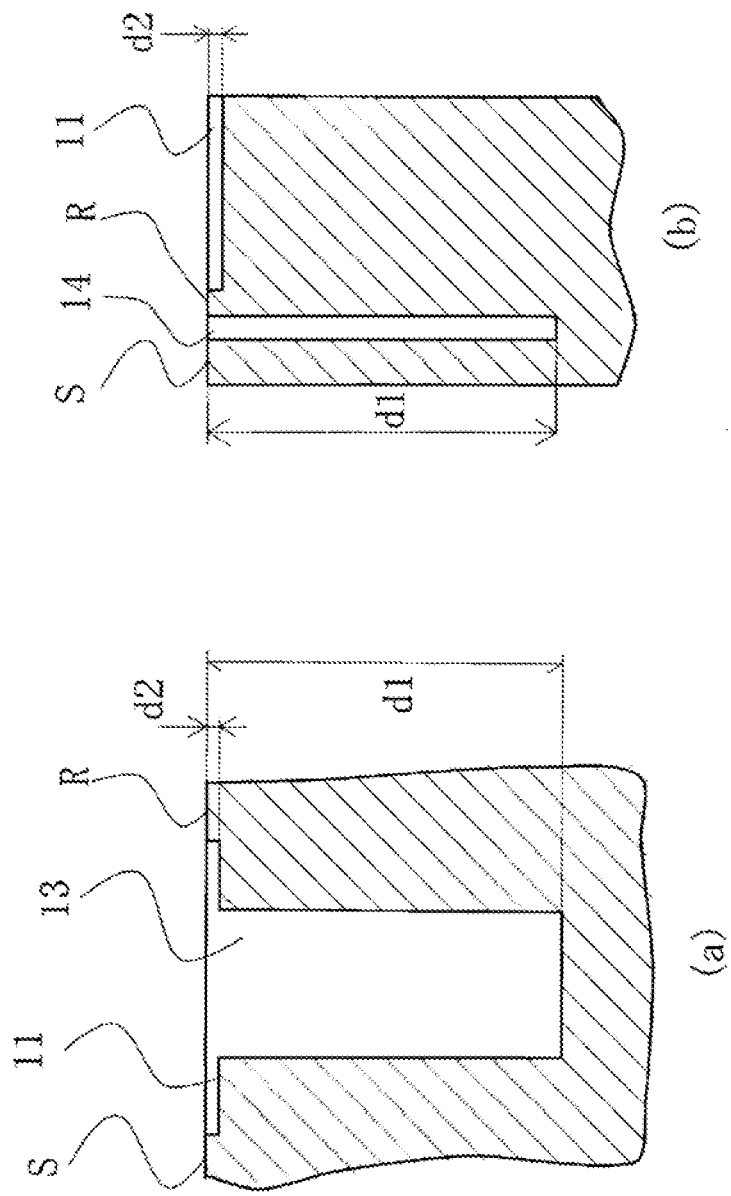
FIG. 3A is a cross-sectional view taken along line A-A in FIG. 2.
FIG. 3B is a cross-sectional view taken along line B-B in FIG. 2.
Figure 4:
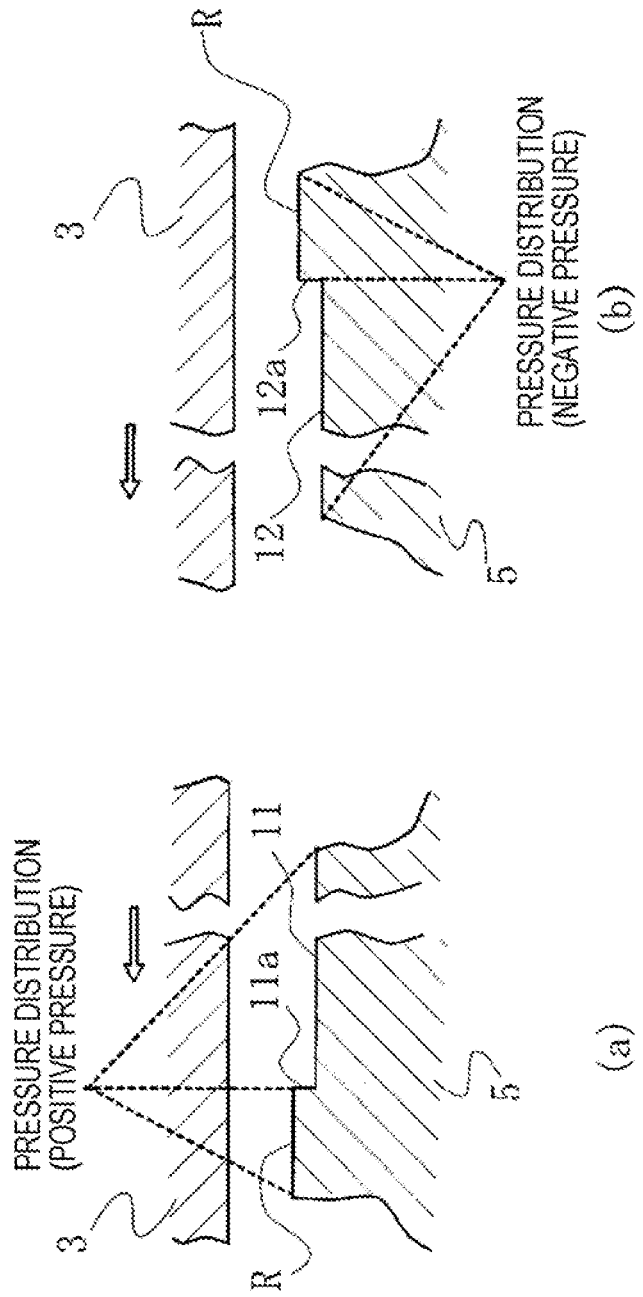

FIG. 2 shows a sliding face of a sliding part according to the first embodiment of the present invention. Here, a case where the present invention is applied to the sliding face of the stationary-side seal ring 5 in FIG. 1 will be described as an example.

Note that a case where the present invention is applied to the sliding face of the rotating-side seal ring 3 is basically the same as the case here. However, in that case, those such as radial deep grooves described later that need to communicate with the low-pressure liquid side do not need to be provided to the outer peripheral side of the sliding face of the rotating-side seal ring 3.

In the description of FIG. 2, it is assumed that the outer peripheral side of the sliding face S of the stationary-side seal ring 5 is the low-pressure liquid side (hereinafter, also referred to as the low-pressure fluid side), the inner peripheral side is the high-pressure gas side (hereinafter, also referred to as the high-pressure fluid side), and the mating sliding face rotates in a counterclockwise direction.

On the sliding face S of the stationary-side seal ring 5, a plurality of positive pressure generation mechanisms 10 each having a positive pressure generation groove 11 are arranged independently of each other. Each positive pressure generation groove 11 is connected to the low-pressure fluid side at the outer peripheral edge, and is isolated from the high-pressure fluid side by a land R (a smooth portion of the sliding face S).

In FIG. 2, each positive pressure generation groove 11 is formed by a groove 11 constituting a Rayleigh step mechanism. Its planar shape is a substantially rectangular shape that has a radial width larger than or equal to half of the width of the sliding face, and a circumferential length slightly larger than the radial width. Each groove 11 is circumferentially isolated from the adjacent grooves 11 by lands R. The grooves 11, the number of which is sixteen, are circumferentially evenly spaced.

Note that the number of the grooves 11 may be at least one. Further, the grooves 11 do not necessarily need to be evenly spaced.

The Rayleigh step mechanism will be described in detail later.

Those constituting the positive pressure generation mechanisms are not limited to the Rayleigh step mechanisms, and for example, may be spiral mechanisms each formed by a spiral groove.

On the sliding face S, an annular deep groove 14 is also provided on the high-pressure fluid side (the inner peripheral side in FIG. 2). The annular deep groove 14 is isolated from the high-pressure fluid side by a land R, and is connected to the low-pressure fluid side through radial deep grooves 13.

The width of a land R between the annular deep groove 14 and the high-pressure fluid side is set to an optimum value according to the pressure difference between the high-pressure fluid and the low-pressure fluid.

Each radial deep groove 13 is connected to the low-pressure fluid side at the outer peripheral end, and is connected to the annular deep groove 14 at the inner peripheral end.

In FIG. 2, the radial deep grooves 13, the number of which is four, are circumferentially evenly spaced (four vertically upper and lower and horizontally right and left ones in FIG. 2), and are each formed in such a manner as to be located at a circumferentially central portion of one of the grooves 11. Consequently, the grooves 11 in places where the radial deep grooves 13 are formed are each divided by the radial deep groove 13 to be formed extending symmetrically on both sides of the radial deep groove 13 in the circumferential direction.

Note that the number of the radial deep grooves 13 may be at least one. Further, the radial deep grooves 13 do not necessarily need to be evenly spaced.

For example, when the pressure difference between the high-pressure fluid and the low-pressure fluid is small, four radial deep grooves may be evenly spaced. When the pressure difference is large, twelve radial deep grooves may be evenly spaced. In such a manner, the introduction of the low-pressure fluid into the sliding face is adjusted.

The groove width and the groove depth of the annular deep groove 14 and the radial deep grooves 13 are set small when the pressure difference between the high-pressure fluid and the low-pressure fluid is small, and are set large when the pressure difference is large.

As shown in FIGS. 3A and 3B, the groove depth d1 of the annular deep groove 14 and the radial deep grooves 13 is deeper than the groove depth d2 of the positive pressure generation grooves 11. Approximately, d1=250d2 to 500d2.

In the example shown in FIG. 2, the same function as the sliding part can be provided not only when the rotational direction of the mating sliding face is the counterclockwise direction but also when it is the clockwise direction. Therefore, the sliding component is suitable for an apparatus that rotates in both directions.

The sliding face may be provided with at least one negative pressure generation mechanism such as a reversed Rayleigh step mechanism or a pumping groove, as a sealing mechanism (leakage prevention mechanism), which is not shown.

The reversed Rayleigh step mechanism will be described in detail later.

Next, with reference to FIGS. 4A and 4B, a positive pressure generation mechanism formed by a Rayleigh step mechanism or the like, and a negative pressure generation mechanism formed by a reversed Rayleigh step mechanism or the like will be described.

In FIG. 4A, the rotating-side seal ring 3, which is an opposite sliding part, and the stationary-side seal ring 5 slide relatively as shown by an arrow. On the sliding face of the stationary-side seal ring 5, a Rayleigh step 11a is formed which is perpendicular to the relative movement direction and faces upstream, constituting a narrowed gap (step). A groove 11 as a positive pressure generation groove is formed upstream of the Rayleigh step 11a. The sliding face S of the opposite rotating-side seal ring 3 and the stationary-side seal ring 5 is flat.

When the rotating-side seal ring 3 and the stationary-side seal ring 5 relatively move in the direction shown by the arrow, fluid intervening between the sliding faces S of the rotating-side seal ring 3 and the stationary-side seal ring 5 tends to follow and move in the movement direction of the rotating-side seal ring 3 or the stationary-side seal ring 5 due to its viscosity. Consequently, at that time, positive pressure (dynamic pressure) as shown by broken lines is generated by the presence of the Rayleigh step 11a.

Note that the reference character R denotes a land.

Also in FIG. 4B, the rotating-side seal ring 3, which is an opposite sliding part, and the stationary-side seal ring 5 slide relatively as shown by an arrow. On the sliding face of the rotating-side seal ring 3 and the stationary-side seal ring 5, a reversed Rayleigh step 12a is formed which is perpendicular to the relative movement direction and faces downstream, constituting a widened gap (step). A groove 12 as a negative pressure generation groove is formed downstream of the reversed Rayleigh step 12a. The sliding face of the opposite rotating-side seal ring 3 and the stationary-side seal ring 5 is flat.

When the rotating-side seal ring 3 and the stationary-side seal ring 5 relatively move in the direction shown by the arrow, fluid intervening between the sliding faces S of the rotating-side seal ring 3 and the stationary-side seal ring 5 tends to follow and move in the movement direction of the rotating-side seal ring 3 or the stationary-side seal ring 5 due to its viscosity. Consequently, at that time, negative pressure as shown by broken lines is generated by the presence of the reversed Rayleigh step 12a.

In FIGS. 1 and 2, in a rest state where the rotating shaft 1 is not driven and the sliding faces S of the rotating-side seal ring 3 and the stationary-side seal ring 5 do not relatively slide, the liquid on the low-pressure fluid side is introduced into the annular deep groove 14 through the radial deep grooves 13 provided on the sliding face S.

Next, when the rotating shaft 1 is driven, rotating the rotating-side seal ring 3, the sliding faces S of the rotating-side seal ring 3 and the stationary-side seal ring 5 slide relatively. Positive pressure is generated by the dynamic pressure generation mechanisms 10, and the sliding faces S are slightly separated from each other. The gas on the high-pressure fluid side tends to flow into the space between the sliding faces S. However, the liquid introduced into the annular deep groove 14 is circumferentially whirled, so that the high-pressure gas is blocked here and cannot enter an inner part between the sliding faces S.

At the same time, the liquid on the low-pressure fluid side enters, forming a liquid film between the sliding faces S.

A test by the present inventors has verified that an annular gas-liquid interface is formed in the vicinity of the high-pressure fluid side of the annular deep groove 14, and the sliding faces are sliding, maintaining fluid lubrication without causing running out of the liquid film.

The sliding component according to the first embodiment of the present invention is as described above, and has the following outstanding effects.

(1) In the sliding component with the pair of sliding parts 3 and 5 sliding relative to each other, with a high-pressure gas present on one side of the pair of sliding parts 3 and 5, and a low-pressure liquid on the other side, the sliding face S of at least one of the sliding parts is provided with the positive pressure generation mechanisms 10 each having the positive pressure generation groove 11, and is provided with the annular deep groove 14 on the high-pressure gas side, and the annular deep groove 14 is isolated from the high-pressure gas side by the land R, and is connected to the low-pressure liquid side through the radial deep grooves 13. Consequently, the sliding component fulfilling both conflicting conditions of sealing and lubrication can be provided which actively introduces the low-pressure liquid into the entire sliding face S while preventing the high-pressure gas from entering the space between the sliding faces S, enabling sliding with the liquid film maintained, and can seal both fluids on the high-pressure side and the low-pressure side.

(2) The groove depth d1 of the annular deep groove 14 and the radial deep grooves 13 is 250 times to 500 times the groove depth d2 of the positive pressure generation grooves 11. Consequently, the liquid on the low-pressure fluid side can be introduced more actively into the entire sliding face S while the entry of the high-pressure gas can be prevented.

(3) The radial deep grooves 13 are circumferentially evenly spaced, so that the liquid can be introduced uniformly into the entire sliding face, and also the liquid can be introduced sufficiently into the annular deep groove 14.

(4) The positive pressure generation grooves 11 are provided on the low-pressure liquid side of the annular deep groove 14, and are connected to the low-pressure liquid side and isolated from the high-pressure gas side by the land R. Consequently, sufficient positive pressure can be generated at the sliding faces, using the viscosity of the low-pressure liquid.

(5) The positive pressure generation grooves 11 are each formed by the groove constituting the Rayleigh step mechanism, and at least some of the grooves are each formed to extend symmetrically on both sides of the radial deep groove 13 in the circumferential direction. Consequently, the sliding component can be suitable for an apparatus in which a rotating-side seal ring rotates in both directions.

Second Embodiment

Figure 5:
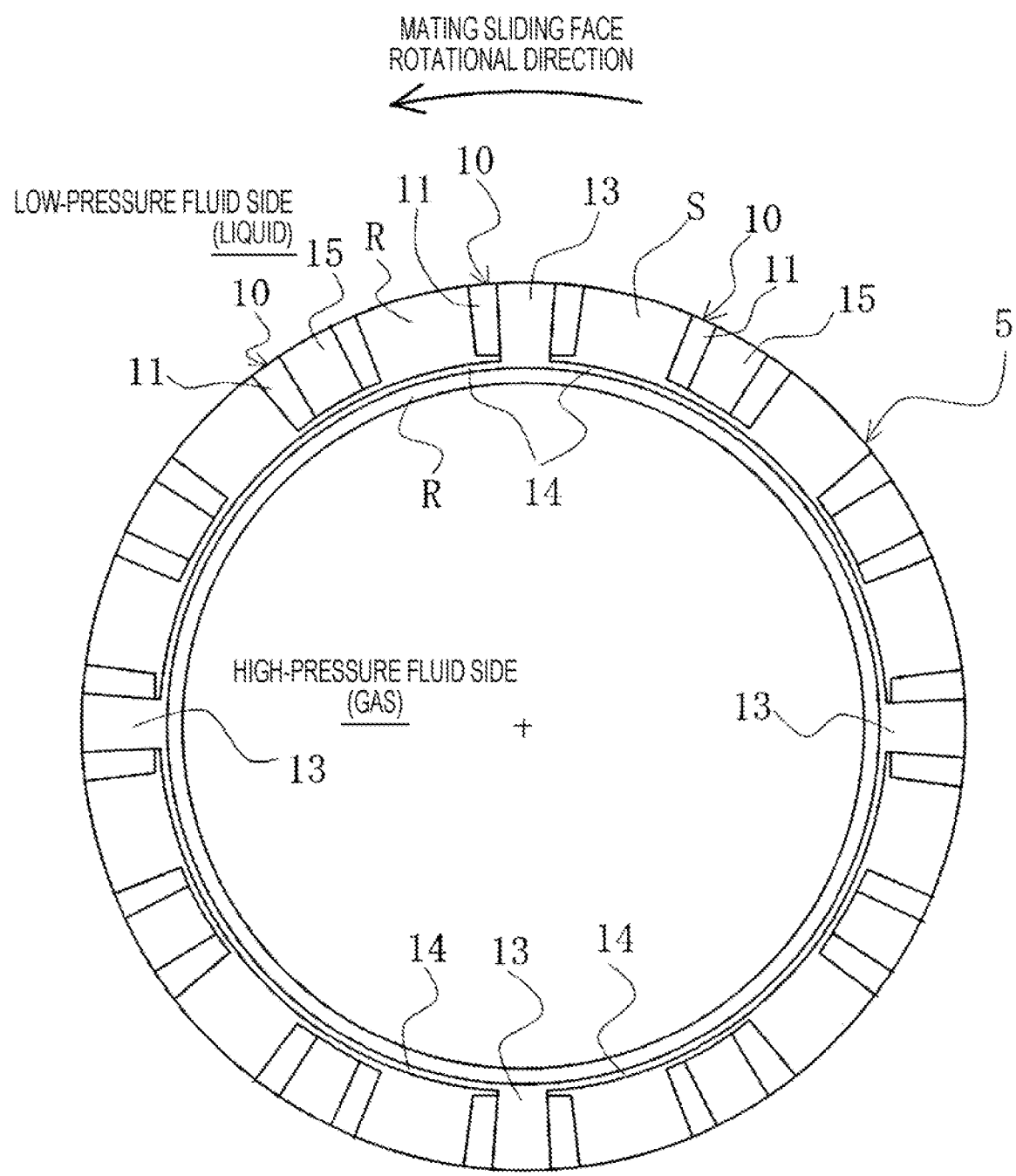
FIG. 5 is a plan view showing a sliding face of a sliding part of a mechanical seal according to a second embodiment of the present invention.

With reference to FIG. 5, a sliding component according to a second embodiment of the present invention will be described.

The second embodiment is different from the first embodiment in that a circumferentially central portion of a groove of a Rayleigh step mechanism constituting a positive pressure generation groove is made one-step lower. The other basic configuration thereof is the same as that of the first embodiment, and the same reference numeral is assigned to the same member as that in the first embodiment without duplicated explanation.

In FIG. 5, on the sliding face S of the stationary-side seal ring 5, a plurality of Rayleigh step mechanisms 10 each having a groove 11 are arranged independently of each other. Each groove 11 is connected to the low-pressure fluid side at the outer peripheral edge, and is isolated from the high-pressure fluid side by a land R.

In FIG. 5, the grooves 11, the number of which is twelve, are circumferentially evenly spaced.

Each radial deep groove 13 is connected to the low-pressure fluid side at the outer peripheral end, and is connected to the annular deep groove 14 at the inner peripheral end. The radial deep grooves 13, the number of which is four, are circumferentially evenly spaced (four vertically upper and lower and horizontally right and left ones in FIG. 5), and each is formed in such a manner as to be located at a circumferentially central portion of one of the grooves 11. Consequently, the grooves 11 in four places where the radial deep grooves 13 are formed are each divided by the radial deep groove 13 to be formed extending symmetrically on both sides of the radial deep groove 13 in the circumferential direction.

In each of the remaining eight grooves 11 where the radial deep grooves 13 are not provided, a liquid introduction assist groove 15 deeper than the groove depth of the grooves 11 is provided at a circumferentially central portion of the groove 11. Consequently, the central portion of each groove 11 is one-step lower.

Like each groove 11, each liquid introduction assist groove 15 is connected to the low-pressure fluid side at the lower-pressure fluid-side end, and is isolated from the annular deep groove 14 at the high-pressure fluid-side end by the land R.

The groove width and the groove depth of the liquid introduction assist grooves 15 are set large when the pressure difference between the high-pressure fluid and the low-pressure fluid is large, and are set small when the pressure difference is small.

The liquid introduction assist grooves 15 have the function of assisting the introduction of the liquid into the sliding face S and assisting the supply of the liquid for positive pressure generation at the grooves 11.

Consequently, even when the pressure difference between the high-pressure fluid and the low-pressure fluid is large, running out of the liquid film between the sliding faces S can be prevented.

Third Embodiment

Figure 6:
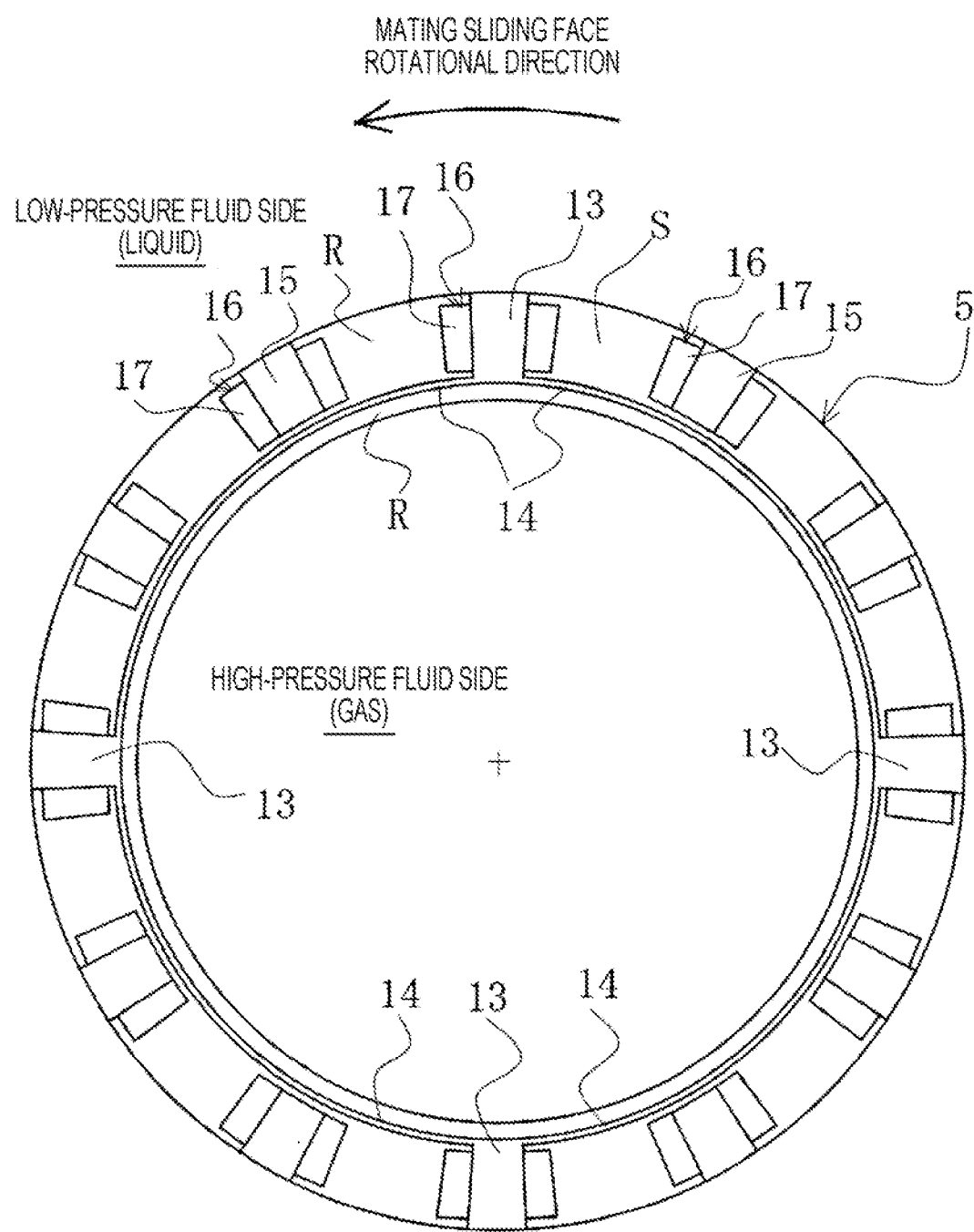
FIG. 6 is a plan view showing a sliding face of a sliding part of a mechanical seal according to a third embodiment of the present invention.

With reference to FIG. 6, a sliding component according to a third embodiment of the present invention will be described.

The third embodiment is different from the second embodiment in that the low-pressure fluid-side edge of a groove of a Rayleigh step mechanism constituting a positive pressure generation groove is isolated from the low-pressure fluid side by a land R. The other basic configuration thereof is the same as that of the second embodiment, and the same reference numeral is assigned to the same member as that in the second embodiment without duplicated explanation.

In FIG. 6, on the sliding face S of the stationary-side seal ring 5, a plurality of Rayleigh step mechanisms 16 each having a groove 17 are arranged independently of each other. The outer peripheral edge of each groove 17 constituting a positive pressure generation groove is isolated from the low-pressure fluid side by a land R, and is also isolated from the high-pressure fluid side by a land R.

Fourth Embodiment

Figure 7:
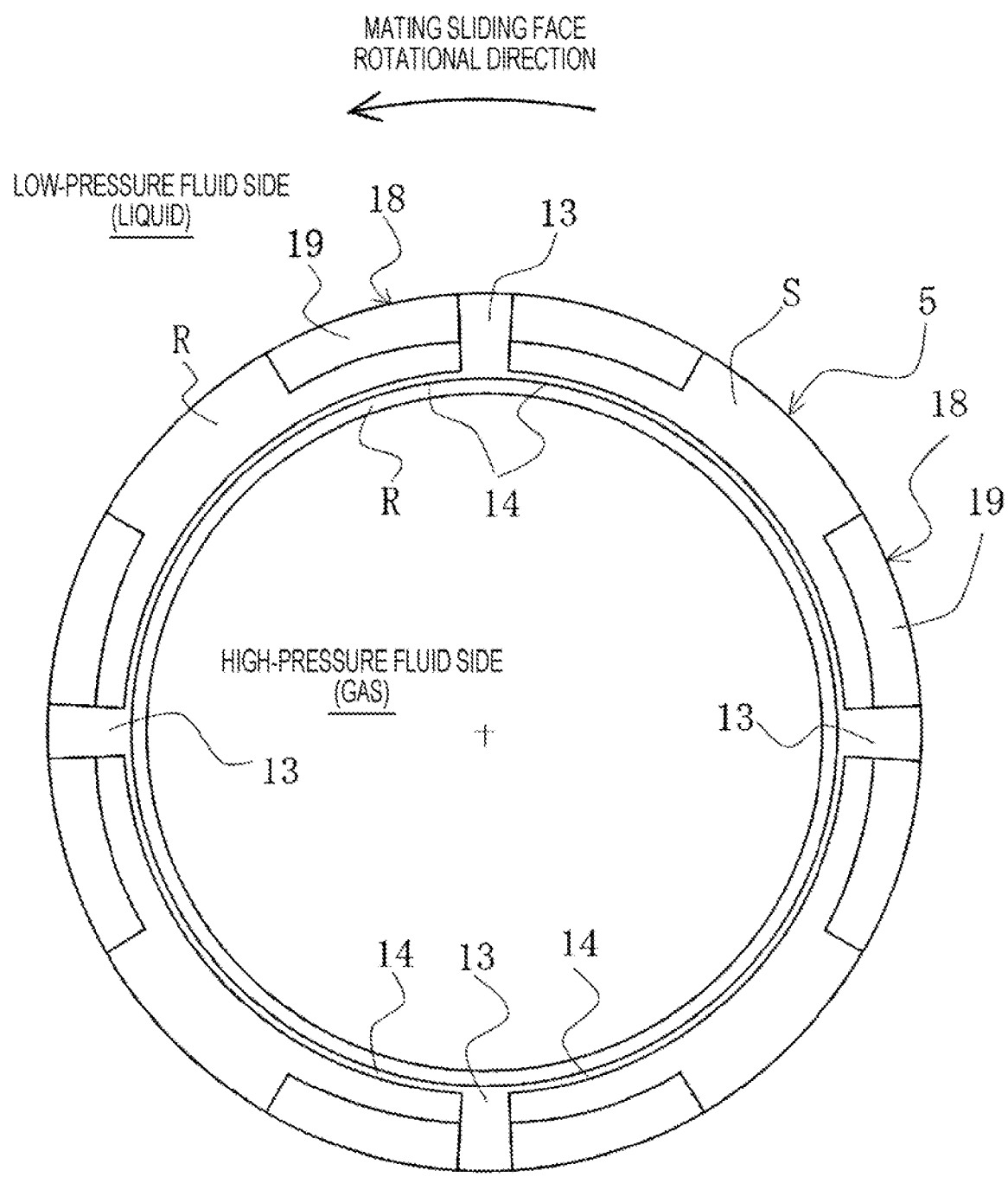
FIG. 7 is a plan view showing a sliding face of a sliding part of a mechanical seal according to a fourth embodiment of the present invention.

With reference to FIG. 7, a sliding component according to a fourth embodiment of the present invention will be described.

The fourth embodiment is different from the second embodiment in that four radial deep grooves are circumferentially evenly spaced, and grooves of Rayleigh step mechanisms constituting positive pressure generation grooves are formed to extend symmetrically only on both sides of the radial deep grooves in the circumferential direction. The other basic configuration thereof is the same as that of the second embodiment, and the same reference numeral is assigned to the same member as that in the second embodiment without duplicated explanation.

In FIG. 7, the four radial deep grooves 13 are circumferentially evenly spaced, and grooves 19 constituting Rayleigh step mechanisms 18 are formed to extend symmetrically only on both sides of the radial deep grooves in the circumferential direction.

Each groove 19 is connected to the low-pressure fluid side at the outer peripheral edge, and is isolated from the high-pressure fluid side by lands R.

The planar shape of each groove 19 is substantially an arch shape in its entirety which has a radial width approximately half of the width of the sliding face, and a circumferential length larger than the radial width. Each groove 19 is circumferentially isolated from the adjacent grooves 19 by lands R.

Fifth Embodiment

Figure 8:
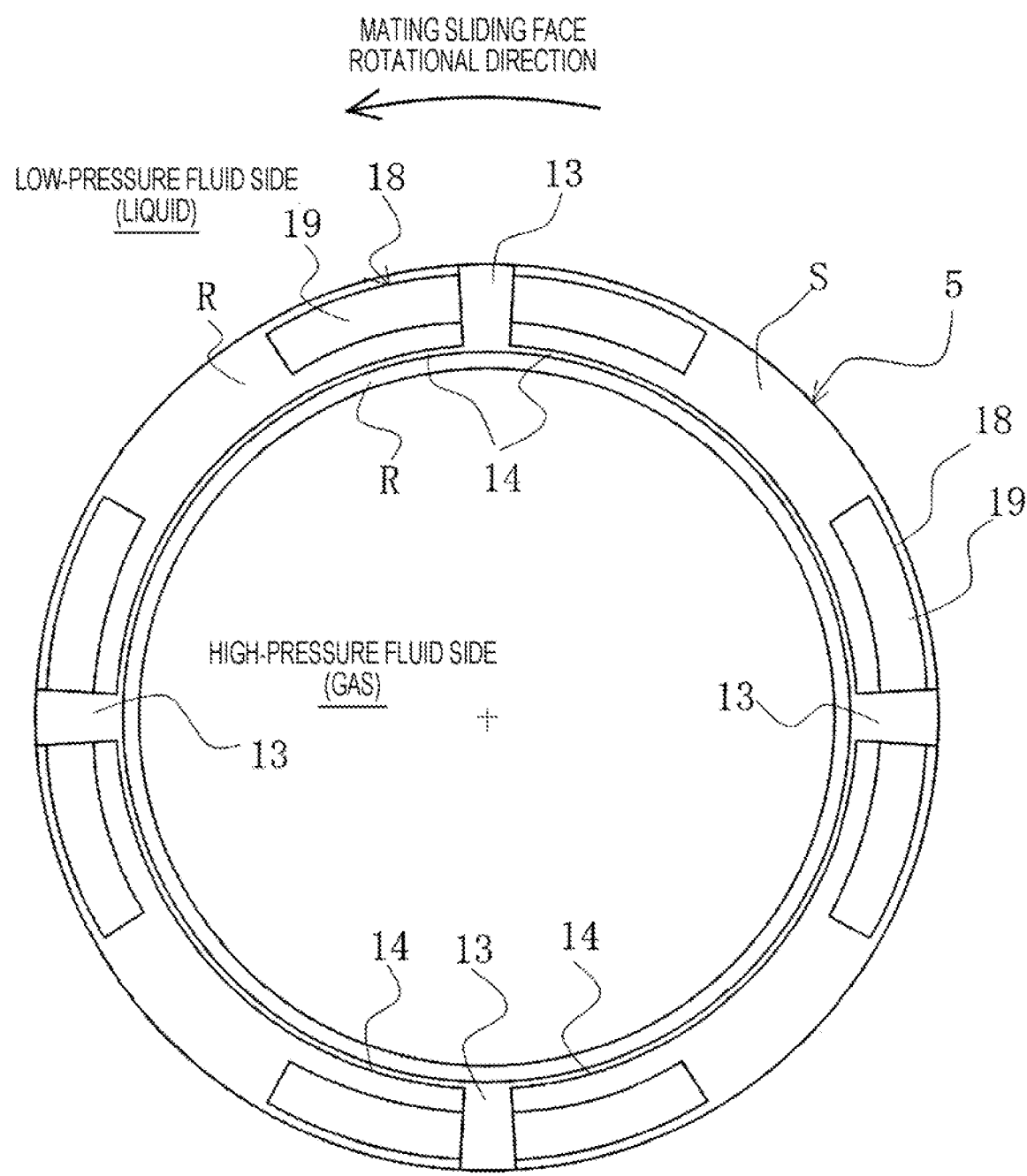
FIG. 8 is a plan view showing a sliding face of a sliding part of a mechanical seal according to a fifth embodiment of the present invention.

With reference to FIG. 8, a sliding component according to a fifth embodiment of the present invention will be described.

The fifth embodiment is different from the fourth embodiment in that the low-pressure fluid-side edge of a groove of a Rayleigh step mechanism constituting a positive pressure generation groove is isolated from the low-pressure fluid side by lands R. The other basic configuration thereof is the same as that of the fourth embodiment, and the same reference numeral is assigned to the same member as that in the fourth embodiment without duplicated explanation.

In FIG. 8, on the sliding face S of the stationary-side seal ring 5, a plurality of Rayleigh step mechanisms 18 each having a groove 19 are arranged independently of each other. Each groove 19 constituting a positive pressure generation groove is isolated from the low-pressure fluid side at the outer peripheral edge by lands R, and is also isolated from the high-pressure fluid side by the lands R.

Sixth Embodiment

Figure 9:
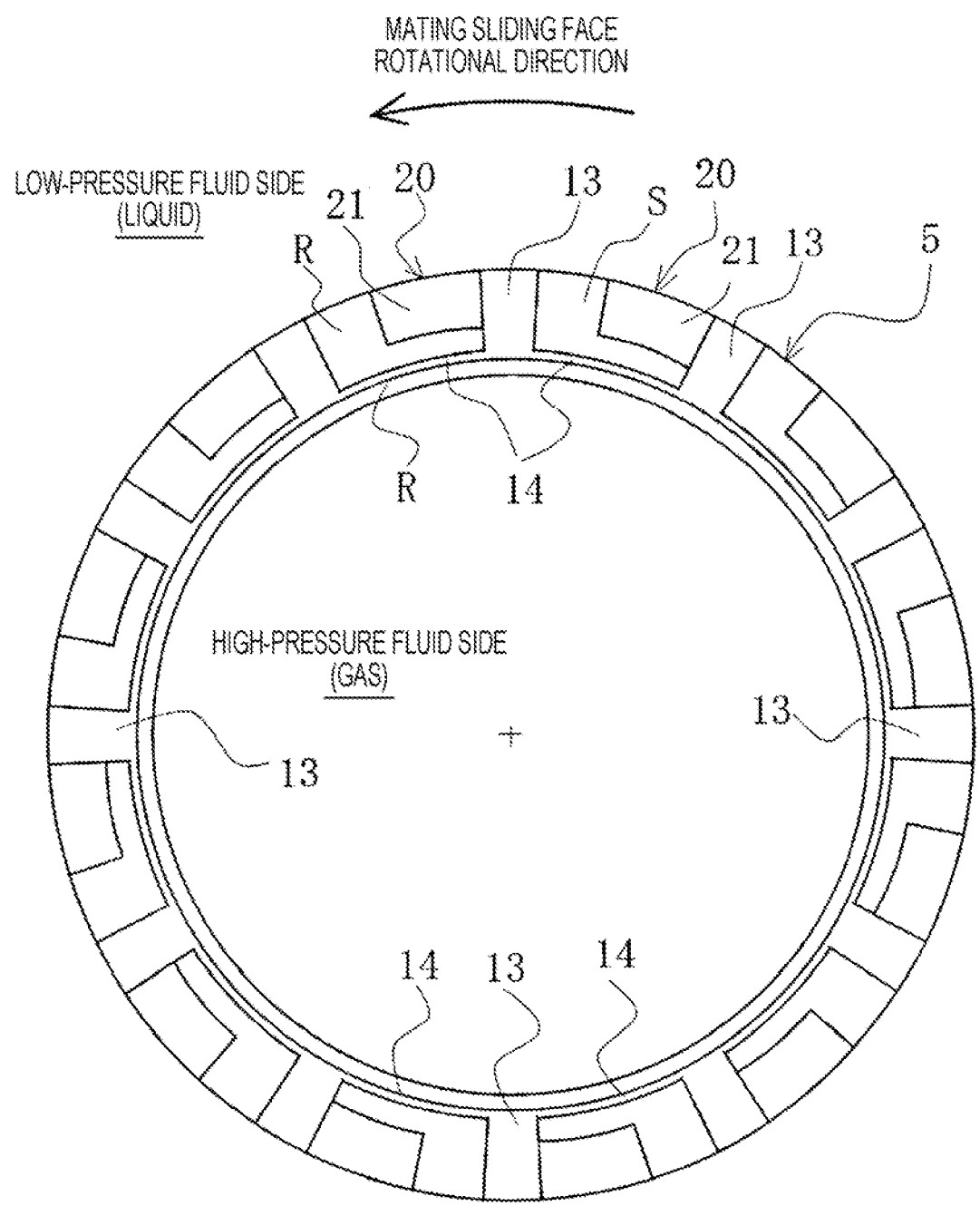
FIG. 9 is a plan view showing a sliding face of a sliding part of a mechanical seal according to a sixth embodiment of the present invention.

With reference to FIG. 9, a sliding component according to a sixth embodiment of the present invention will be described.

The sixth embodiment is different from the first to fifth embodiments in that grooves of Rayleigh steps constituting positive pressure generation grooves are provided only downstream of radial deep grooves. The other basic configuration thereof is the same as those of the first to fifth embodiments, and the same reference numeral is assigned to the same member as that in the first to fifth embodiments without duplicated explanation.

In FIG. 9, on the sliding face S of the stationary-side seal ring 5, a plurality of Rayleigh step mechanisms 20 each having a groove 21 are arranged independently of each other. Each groove 21 is connected to the low-pressure fluid side at the outer peripheral edge, and is isolated from the high-pressure fluid side by a land R.

On the sliding face S, the annular deep groove 14 is also provided on the high-pressure fluid side. The annular deep groove 14 is isolated from the high-pressure fluid side by the land R, and is connected to the low-pressure fluid side through the radial deep grooves 13.

Each radial deep groove 13 is connected to the low-pressure fluid side at the outer peripheral end, and is connected to the annular deep groove 14 at the inner peripheral end.

In FIG. 9, the radial deep grooves 13, the number of which is twelve, are circumferentially evenly spaced. The upstream ends of the grooves 21 are connected to the radial deep grooves 13.

Since the grooves 21 are provided only downstream of the radial deep grooves 13, the sliding component is suitable for a one-way rotating apparatus where the rotational direction of the mating sliding face is the counterclockwise direction.

Seventh Embodiment

Figure 10:
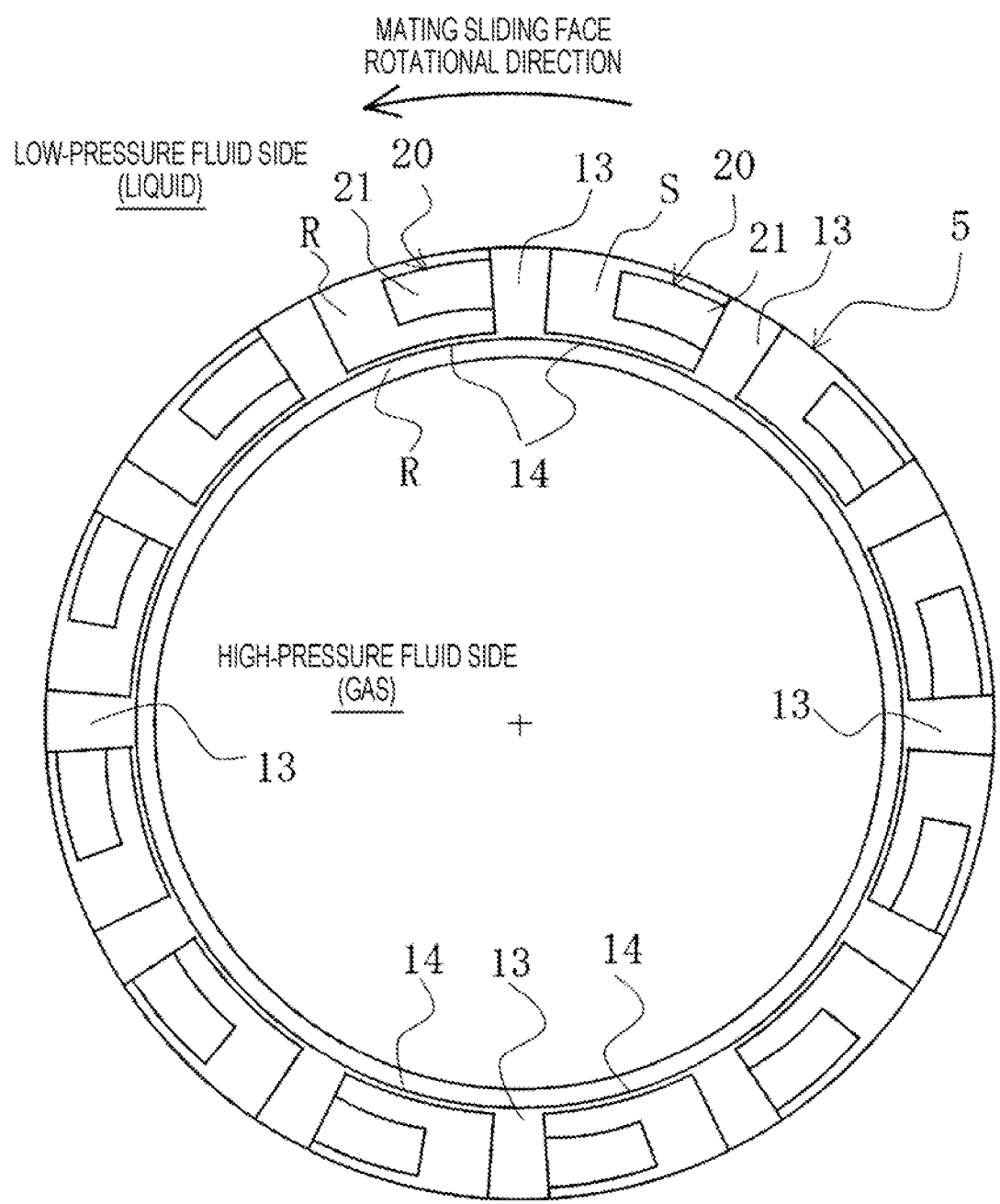
FIG. 10 is a plan view showing a sliding face of a sliding part of a mechanical seal according to a seventh embodiment of the present invention.

With reference to FIG. 10, a sliding component according to a seventh embodiment of the present invention will be described.

The seventh embodiment is different from the sixth embodiment in that the low-pressure fluid-side edge of a groove of a Rayleigh step mechanism constituting a positive pressure generation groove is isolated from the low-pressure fluid side by a land R. The other basic configuration thereof is the same as that of the sixth embodiment, and the same reference numeral is assigned to the same member as that in the sixth embodiment without duplicated explanation.

In FIG. 10, on the sliding face S of the stationary-side seal ring 5, a plurality of Rayleigh step mechanisms 20 each having a groove 21 are arranged independently of each other. Each groove 21 constituting a positive pressure generation groove is isolated from the low-pressure fluid side at the outer peripheral edge by a land R, and is also isolated from the high-pressure fluid side by the land R.

Although the embodiments of the present invention have been described above with reference to the drawings, a specific configuration of the present invention is not limited to these embodiments. Any changes and additions made to the embodiments without departing from the scope of the present invention are included in the present invention.

For example, although the embodiments have described the case where the sliding part is used as one of a pair of a rotating seal ring and a stationary seal ring in a mechanical seal device, the sliding part can be used as a bearing sliding part that slides on a rotating shaft while sealing lubricating oil on axially one side of a cylindrical sliding face.

Further, for example, although the embodiments have described the case where the low-pressure liquid is present on the outer peripheral side, and the high-pressure gas on the inner peripheral side, the present invention is applicable to the opposite case.

Further, for example, the embodiments have described the case where the positive pressure generation mechanisms, the negative pressure generation mechanisms, and the deep groove are provided on the stationary-side seal ring of the mechanical seal constituting the sliding component. Conversely, they may be provided on the rotating-side seal ring.

Further, for example, although the embodiments have described the case where the positive pressure generation mechanisms are formed by the Rayleigh step mechanisms, the positive pressure generation mechanisms are not limited to them, and may be formed by spiral mechanisms, for example.

Further, for example, although the embodiments have described the case where the four radial deep grooves are circumferentially evenly spaced, the number is not limiting. When the pressure difference between the inner and outer peripheral fluids is large, more radial deep grooves may be provided, and when the pressure difference is small, fewer radial deep grooves may be provided.

REFERENCE SIGNS LIST 1 rotating shaft
2 sleeve
3 rotating-side seal ring
4 housing
5 stationary-side seal ring
6 coiled wave spring
7 bellows
10 positive pressure generation mechanism (Rayleigh step mechanism)
11 positive pressure generation groove (groove constituting Rayleigh step mechanism)
11a Rayleigh step
12 groove constituting reversed Rayleigh step mechanism
12a reversed Rayleigh step
13 radial deep groove
14 annular deep groove
15 liquid introduction assist groove
16, 18, 20 positive pressure generation mechanism (Rayleigh step mechanism)
17, 18, 21 positive pressure generation groove (groove constituting Rayleigh step mechanism)
S sealing face
R land

The invention claimed is:

1. A sliding component comprising:
a pair of sliding parts sliding relative to each other, with a high-pressure gas present on one side of the pair of sliding parts and a low-pressure liquid on the other side, at least one of the sliding parts having a sliding face:
provided with at least one positive pressure generation groove, and
provided with an annular deep groove on the high-pressure gas side, the annular deep groove being isolated from the high-pressure gas side by a land, and being connected to the low-pressure liquid side through a radial deep groove,
wherein the at least one positive pressure generation groove is provided on the low-pressure liquid side of the annular deep groove, and is connected to the low-pressure liquid side and isolated from the high-pressure gas side by a land.

2. The sliding component according to claim 1, wherein the annular deep groove and the radial deep groove have a groove depth 250 times to 500 times a groove depth of the at least one positive pressure generation groove.

3. The sliding component according to claim 2, wherein the radial deep groove is one of a plurality of radial deep grooves provided circumferentially.

4. The sliding component according to claim 3, wherein the sliding face of the one sliding part is provided with at least one negative pressure generation groove having a widened step to create negative pressure at the step when in operation.

5. The sliding component according to claim 2, wherein the sliding face of the one sliding part is provided with at least one negative pressure generation groove having a widened step to create negative pressure at the step when in operation.

6. The sliding component according to claim 1, wherein the radial deep groove is one of a plurality of radial deep grooves provided circumferentially.

7. The sliding component according to claim 6, wherein the sliding face of the one sliding part is provided with at least one negative pressure generation groove having a widened step to create negative pressure at the step when in operation.

8. The sliding component according to claim 1, wherein the at least one positive pressure generation groove is two or more positive pressure generation grooves,
wherein each of the two or more positive pressure generation grooves has a narrowed step to create positive pressure at the step when in operation, and
the two or more positive pressure generation grooves include positive pressure generation grooves disposed to extend symmetrically on both sides of the radial deep groove in a circumferential direction.

9. The sliding component according to claim 8, wherein the sliding face of the one sliding part is provided with at least one negative pressure generation groove having a widened step to create negative pressure at the step when in operation.

10. The sliding component according to claim 1, wherein the at least one positive pressure generation groove is two or more positive pressure generation grooves,
wherein each of the two or more positive pressure generation grooves has a narrowed step to create positive pressure at the step when in operation, and
the two or more positive pressure generation grooves include adjacent two positive pressure generation grooves provided with a liquid introduction assist groove formed circumferentially therebetween.

11. The sliding component according to claim 10, wherein the sliding face of the one sliding part is provided with at least one negative pressure generation groove having a widened step to create negative pressure at the step when in operation.

12. The sliding component according to claim 1, wherein the sliding face of the one sliding part is provided with at least one negative pressure generation groove having a widened step to create negative pressure at the step when in operation.

* * * * *